Oct. 20, 1936.  S. B. HASELTINE  2,057,827
POWER HAND BRAKE
Filed Jan. 10, 1935  2 Sheets-Sheet 1
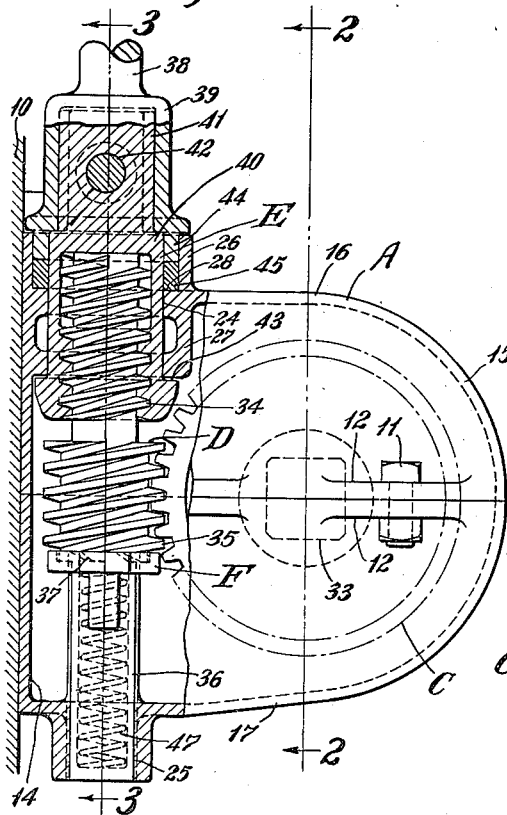
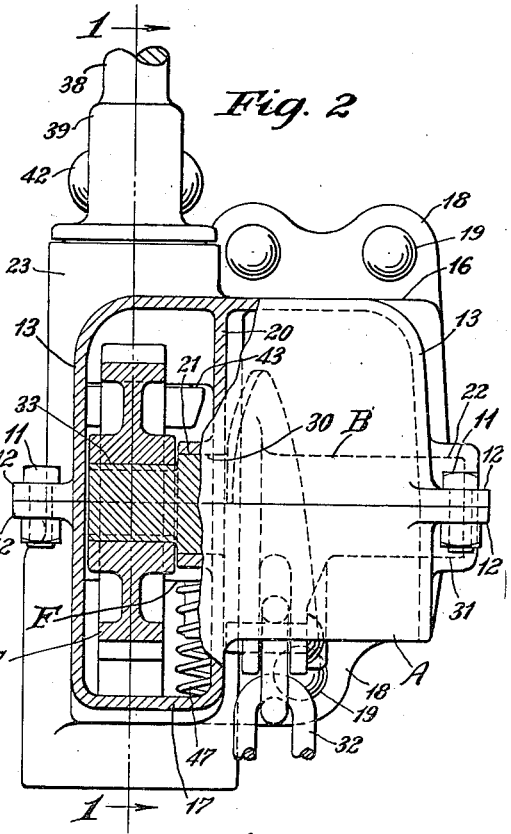
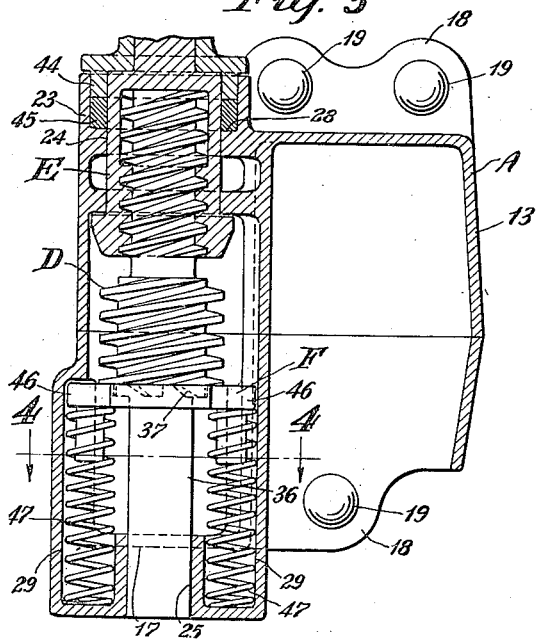
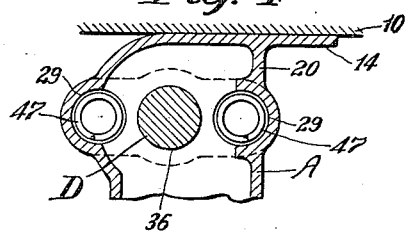
Inventor
Stacy B. Haseltine
By Henry Fuchs
Atty.

Oct. 20, 1936.   S. B. HASELTINE   2,057,827
POWER HAND BRAKE
Filed Jan. 10, 1935   2 Sheets-Sheet 2
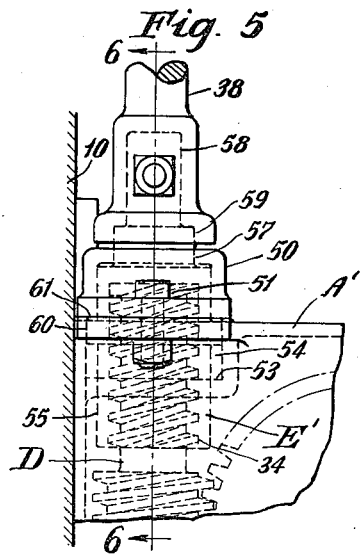
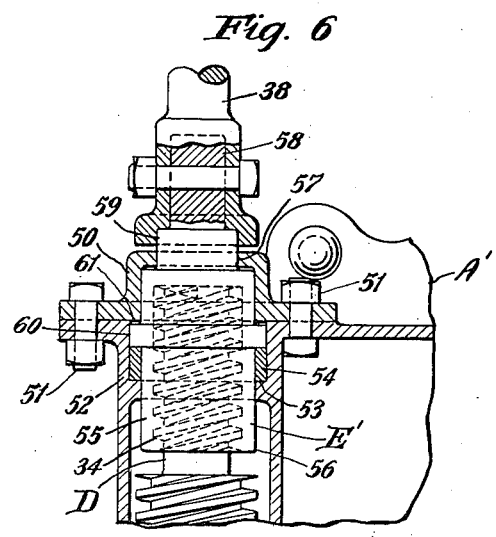
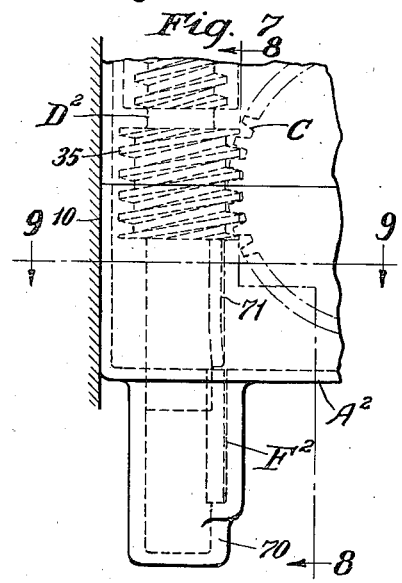
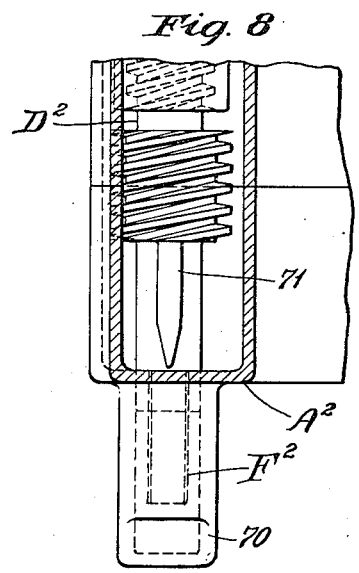
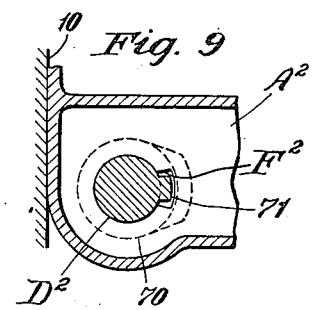
Inventor
Stacy B. Haseltine
By Henry Fuchs
Atty.

Patented Oct. 20, 1936

2,057,827

UNITED STATES PATENT OFFICE 2,057,827

POWER HAND BRAKE

Stacy B. Haseltine, Chicago, Ill., assignor to W. H. Miner, Inc., Chicago, Ill., a corporation of Delaware Application January 10, 1935, Serial No. 1,112

17 Claims. (Cl. 74—505)

This invention relates to improvements in power hand brakes, especially adapted for use in connection with railway cars.

One object of the invention is to provide a hand brake mechanism of simple design, including rotary chain winding means, wherein the power is greatly multiplied during application of the brakes, and wherein means, in the form of a screw threaded connection between the manually operated actuating member and the cooperating driving gear, is provided for controlling the operation of the brakes to automatically effect rotation of the chain winding means to tighten the brakes when the actuating member is rotated in one direction, and to automatically break the driving connection between the driving means and the chain winding means, after a predetermined backing off of the brakes when the actuating member is rotated in a reverse direction, thereby permitting free rotation of the winding means to quickly release the brakes after said backing off operation has been completed, without further movement of the actuating member.

Another object of the invention is to provide a power hand brake mechanism of the worm gear driven type, comprising a winding drum actuated by means of a worm wheel connected to the drum, a rotatable worm element engageable with the worm wheel, and rotary means for actuating the worm element, wherein the worm is automatically engaged with and disengaged from the worm wheel by a screw threaded connection between the actuating means and worm which advances the worm to operatively engaged position upon rotation of the actuating means in brake applying direction, and retracts the worm from said operatively engaged position upon rotation of the actuating means in a reverse direction.

A further object of the invention is to provide a brake mechanism of the character specified in the preceding paragraph, wherein the engagement of the worm element with the worm wheel is automatically effected by displacing said worm element in an axial direction tangent to the worm wheel and towards said wheel through screwing of the worm into said actuating means by rotation of the latter in direction to apply the brakes, and wherein disengagement of the worm element and worm wheel is automatically effected by displacement of said worm in a reverse direction through the actuating means and the worm being unscrewed by rotation of the actuating means in brake releasing direction, the cooperating threaded parts of the actuating means and the worm and the cooperating threads of the worm and worm wheel being so arranged and designed that a predetermined backing off of the brake mechanism is effected before complete disengagement of the worm from the worm wheel.

A still further object of the invention is to provide in a mechanism of the character set forth in the preceding paragraph, automatically operated holding means for temporarily preventing rotation of the worm element in brake releasing direction, at the time the worm element is engaged with the worm wheel while being rotated in brake applying direction, to compel axial movement of the worm immediately upon rotation of the actuating means in brake releasing direction, thereby displacing the worm to effect backing off of the brakes followed by complete disengagement of the worm from the worm wheel to produce quick and complete release of the brake mechanism.

Other objects of the invention will more clearly appear from the description and claims hereinafter following.

In the drawings forming a part of this specification, Figure 1 is a vertical sectional view through a portion of the end wall of a railway car, illustrating my improved brake mechanism in connection therewith, the brake mechanism being shown partly in side elevation and partly in vertical section, said vertical section corresponding substantially to the line 1—1 of Figure 2, certain parts of the brake mechanism being broken away. Figure 2 is a part vertical sectional and part end elevational view of the mechanism illustrated in Figure 1, the vertical section corresponding substantially to the line 2—2 of Figure 1. Figure 3 is a vertical sectional view, partly broken away, corresponding substantially to the line 3—3 of Figure 1. Figure 4 is a broken, horizontal sectional view, corresponding substantially to the line 4—4 of Figure 3. Figure 5 is a broken, side elevational view, illustrating another embodiment of the invention, the upper portion of said mechanism only being shown in said view. Figure 6 is a vertical sectional view, corresponding substantially to the line 6—6 of Figure 5. Figure 7 is a broken, side elevational view of the lower portion of the improved brake mechanism, illustrating still another embodiment of the invention. Figure 8 is a vertical sectional view, corresponding substantially to the line 8—8 of Figure 7. Figure 9 is a horizontal sectional view, corresponding substantially to the line 9—9 of Figure 7.

In said drawings, 10 indicates the end wall of a railway car upon which my improved brake mechanism is mounted.

Referring first to the embodiment of the invention illustrated in Figures 1 to 4 inclusive, my improved hand brake mechanism comprises a housing A; a chain winding drum B rotatably supported in said housing; a worm wheel C connected to the drum; a worm element D cooperating with the worm wheel; a rotatable actuating member E having a screw threaded connection with the worm element; and holding means F in the form of ratchet mechanism cooperating with the worm element.

The housing A is preferably composed of upper and lower sections which are secured together by bolts 11—11 or any other well-known form of securing elements connecting flanges 12—12 provided on said upper and lower sections of the housing. The housing A has vertical side walls 13—13, a vertical rear wall 14, a curved front wall 15, and top and bottom walls 16 and 17 connected with the curved front wall 15. The rear wall is preferably provided with sections 18—18 by means of which the same is fixed to the end wall 10 of the car. Rivets 19—19 or any other well-known form of securing means extending through the sections 18 of the back wall 14 of the housing A and the end wall 10 of the car are employed to mount the housing on said end wall. The interior of the housing is divided into two compartments by a vertically disposed wall member 20 arranged between the side walls 13—13. As clearly shown in Figure 2, the partition wall 20 is provided with a bearing opening 21 for a purpose hereinafter set forth. The right hand side wall, as viewed in Figure 2, is also provided with a bearing opening 22 which is in alignment with the opening 21. The rear section of the housing is vertically enlarged, as indicated at 23. Said enlarged section 23 is provided with bearing openings 24 and 25 at the top and bottom thereof. The bearing opening 24 is reenforced by annular flanges 26 and 27 extending above and below the top wall 16 of said housing A. The bottom bearing opening 25, which is of smaller diameter than the bearing opening 24, is also reenforced by an annular flange, which is exterior to the housing. As clearly shown in Figure 1, the upper section of the bearing opening 24 is of greater diameter than the lower section thereof, thus providing an annular shoulder 28. As most clearly illustrated in Figures 3 and 4, the lower end portion of the section 23 of the housing has vertically disposed guideways 29—29 at opposite sides thereof, which cooperate with the holding means F, as hereinafter more fully described.

The chain winding drum B is rotatably mounted within the right hand compartment of the housing A, as viewed in Figure 2, and has cylindrical bearing sections 30 and 31 at opposite ends thereof, respectively, rotatably mounted in the bearing openings 21 and 22 of the housing A. The brake chain, which is indicated at 32, is secured to the drum in the usual manner and is adapted to be wound thereon in applying the brakes. The chain passes through the lower portion of the housing, which is open to accommodate the same, and is connected to the brake rigging proper of the car. At the left hand end, the drum B, as viewed in Figure 2, has an extension 33 to which the worm wheel C is fixed.

The worm element D has upper and lower right hand threaded sections 34 and 35 thereon. As clearly shown in Figures 1 and 3, the upper threaded section 34 is of smaller diameter than the threaded section 35 and the last named threaded section is of lesser length than the section 34. The lower end portion of the worm, which is indicated by 36, is of cylindrical cross-section and has rotary and sliding bearing engagement within the opening 25 at the bottom of the housing A. The cylindrical section 36 is of appreciably smaller diameter than the threaded section 35 of the worm C and the lower end portion of said threaded section 35 is provided with an annular set of ratchet teeth 37, which cooperate with the holding means F, as hereinafter described.

The rotatable actuating member is in the form of a vertical shaft or staff 38 having the usual operating hand wheel fixed to the upper end thereof. The lower end of the shaft 38 is provided with an enlarged portion 39 having a downwardly opening, substantially square pocket therein. The actuating member E also includes an internal threaded sleevelike section 40, which is in threaded engagement with the section 34 of the worm element D. The sleeve 40 is closed at the upper end and has a round extension 41 with opposed flattened sides thereon which fits within the pocket of the shaft 38 and is secured thereto by means of a transverse rivet 42. At the bottom end, the sleeve 40 is provided with an annular shoulder 43, which abuts the bottom face of the annular flange 27 to thereby hold said sleeve against upward displacement. At the lower end, the enlarged section 39 of the shaft 38 is provided with an annular flange 44 which fits within the enlarged portion of the bearing opening 24 of the housing A. An annular ring or washer 45 is interposed between the flange 44 and the shoulder 28 of the bearing opening 24, thereby holding the sleeve 40 of the actuating member E against downward displacement.

The holding means F comprises a platelike section having an annular set of ratchet teeth at the top thereof cooperating with the ratchet teeth 37 of the worm element D. At opposite sides, the platelike section of the holding means F is provided with curved portions 46—46, which slidingly engage in the guideways 29—29 of the housing A. The holding means F is held yieldingly engaged with the ratchet teeth of the worm D by means of springs 47—47 interposed between the platelike section of the holding means and the bottom wall of the section 23 of the housing A.

In Figures 1, 2, and 3 of the drawings, the worm element D is shown in driving engagement with the worm wheel C. In tightening the brakes, the hand wheel is rotated in a right hand direction, thereby causing rotation of the actuating member E in the same direction. With the worm engaged with the worm wheel as shown in said figures, the chain winding drum will be rotated so as to wind the chain 32 thereon and tighten the brakes. In releasing the brakes, the hand wheel is rotated in a left hand direction, thereby rotating the actuating member E in the same direction. Inasmuch as the cooperating ratchet teeth of the worm D and the holding means F are so arranged as to prevent rotation of the worm D in a left hand direction, the actuating member E will be rotated with respect to the worm element D, thereby unscrewing the threaded section 34 thereof from the sleeve of the actuating member E. This operation of the mechanism causes the worm to slide downwardly, thereby effecting rotation of the chain winding drum in brake releasing direction to effect a predetermined backing off of the brakes. This backing off action continues until the threads 35 of the worm are completely disengaged from the cooperating threads of the worm wheel C, whereupon the worm wheel and chain winding drum B are free to rotate to permit complete unwinding of the chain 32 from the drum and full release of the brakes. Inasmuch as the thrust transmitted to the worm D from the worm wheel C is in a downward direction, the unscrewing of the threaded section 34 from the sleeve of the actuating member E during said backing off action of the brakes is assured. As will be evident, if the brakeman so desires he may again apply the brakes without complete disengagement of the worm from the worm wheel C. When the brake has been completely released and the threads 35 of the worm are in disengaged position with respect to the worm wheel C, rotation of the hand wheel and the shaft 38 in a right hand or brake applying direction, will immediately effect upward movement of the worm D through screwing of the threaded section 34 of the worm into the sleeve of the actuating member E. The frictional resistance between the cooperating ratchet teeth of the holding means F and the worm D is sufficient to prevent rotation of the worm D with the actuating member E until the threads 35 are brought into engagement with the threads of the worm wheel C. During the initial winding action of the chain 32 on the drum B, the threaded section 34 of the worm D will be screwed completely into the sleeve of the actuating member E and the parts will assume the position shown in Figures 1 and 3. Further rotation of the actuating member E in chain winding direction will cause the worm D to rotate in unison with the actuating member until the brakes have been fully set.

Referring next to the embodiment of the invention illustrated in Figures 5 and 6, the improvements include a modified form of housing A' and a rotatable actuating member E' cooperating with the worm D and other parts of the improved brake mechanism as illustrated in Figures 1 to 4 inclusive. The housing A' corresponds to the housing A, hereinbefore described, with the exception that the top of the housing is provided with a bearing cap 50 and that the bearing seat, which corresponds to the bearing opening 24 in Figures 1 and 3, is modified. The cap 50 of the housing A' is fixed thereto by bolts 51—51 extending through the top wall of the housing and cooperating flange portions on the cap 50. The bearing seat at the top of the housing, which is indicated by 52, is provided with an annular shoulder 53 on which a ring or washer 54 is seated. The interior of the cap 50 is of smaller diameter than the bearing seat 52, as clearly illustrated in Figure 6. The upper wall of the cap is provided with a bearing opening 57 which is concentric with the interior bearing opening of said cap.

The actuating member E' comprises a shaft or staff identical with the staff 38, hereinbefore described, and a threaded sleeve 55, which has an internal thread cooperating with the thread 34 at the upper end of the worm element D. The sleeve 55 has a cylindrical lower end portion 56 which fits the opening in the annular rib which forms the shoulder 53. At the upper end, the sleeve 55 is provided with a square portion 58 which is seated in a socket at the lower end of the shaft 38 and secured thereto by a bolt or any other well-known type of securing means. Below the square portion 58, the sleeve is provided with a cylindrical bearing portion 59, which is engaged in the opening 57 of the cap 50. The sleeve 55 also has an annular rib 60, which is spaced above the lower end of the sleeve and is seated between the ring 54 and the shoulder 61 provided by the bottom of the cap 50. As will be evident, the sleeve is thus mounted in the housing so as to prevent upward and downward displacement thereof, the rib 60 having shouldered engagement with the cap 50 and the ring 54 for this purpose. The operation of the brake mechanism shown in Figure 5 is substantially the same as the operation of the mechanism described in connection with Figures 1 to 4 inclusive.

Referring next to the embodiment of the invention illustrated in Figures 7, 8, and 9, the improved construction includes a modified form of housing $A^2$, a worm $D^2$, and holding means $F^2$ cooperating with the worm $D^2$. As shown in Figures 7, 8, and 9, the housing $A^2$ is similar to the housing A, hereinbefore described, with the exception that the enlarged rear portion of said housing is provided with a modified bearing member 70, which accommodates the lower end portion of the worm member $D^2$, which is substantially the same as the worm D, hereinbefore described, with the exception that it is provided with a stop rib or locking element 71, which cooperates with the means $F^2$ for holding the worm against rotation during a certain phase of the operation of the device. The bearing member 70 is in the form of a sleeve section closed at the lower end, and substantially fits the cylindrical lower end shaft section of the worm $D^2$. As shown in Figures 7 and 9, the sleeve 70 is enlarged at the right hand side, said enlarged portion being internally slotted as indicated at $F^2$ to provide the modified form of holding means.

The operation of the modified form of mechanism illustrated in Figures 7, 8, and 9 is substantially the same as the operation of the device, hereinbefore described in connection with Figures 1 to 4 inclusive, with the exception that the worm is not held against backward rotation while the threads 35 thereof are fully engaged with the threads of the worm wheel C. In releasing the brakes while the sleeve of the operating staff or shaft is being rotated in a left hand direction, the worm $D^2$ will be unscrewed therefrom, thereby causing downward movement of the worm in the same manner as in Figures 1 to 4 inclusive. This downward movement of the worm will continue until the locking rib 71 engages within the slot $F^2$, whereupon rotation of the worm will be arrested. During further operation of the device in brake releasing direction, the worm $D^2$ will be moved downwardly without any further rotation thereof until the same is completely disengaged from the worm wheel. When the actuating member of the brake mechanism is rotated in a direction to tighten the brakes, the upper threaded section of the worm $D^2$ will be screwed into the sleeve of the actuating member to reengage the threads 35 of the worm with the threads of the worm wheel C. As will be evident, during this action the worm $D^2$ is held against rotation by the rib 71 being engaged within the slot $F^2$. Before the worm assumes the fully engaged position shown in Figure 7, the rib 71 is completely disengaged from the locking slot $F^2$, thereby permitting rotation of the worm $D^2$ during the further application of the brakes.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding drum; of a worm wheel connected to the drum for rotating the latter; a worm engageable with the worm wheel for rotating the same; manually operated rotary actuating means; constantly interengaged means on said operating means and worm for moving the worm in an axial direction through relative rotation of said actuating means and worm during rotation of said actuating means in one direction to back off the brakes and disengage the worm from the worm wheel after a predetermined backing off of the brakes; and cooperating stop means on said actuating means and worm for locking said worm to the actuating means to effect rotation of said worm during rotation of the actuating means in brake tightening direction.

2. In a hand brake mechanism, the combination with a rotary chain winding element; of cooperating worm and worm wheel means for actuating said winding element; manually operated rotary means for actuating the brakes; and a screw connection between said worm and manually operated means, said screw connection being actuated by said manually operated means for engaging the worm with the worm wheel, and disengaging the same therefrom after a predetermined backing off of the brake mechanism.

3. In a hand brake mechanism, the combination with a rotary chain tightening element; of cooperating worm and worm wheel means for rotating said element; manually actuated rotary operating means; and a screw connection between said operating means and worm means, controlled by rotation of said operating means with respect to the worm means for withdrawing the worm means from engagement with the worm wheel after backing off of the brake to a predetermined extent through rotation of said operating means in brake releasing direction.

4. In a hand brake mechanism, the combination with a rotary tightening element; of a worm wheel member operatively connected to said element for rotating the same; a rotary actuating member, said member being screw threaded; an axially displaceable rotary worm member having two sets of threads thereon, one of said sets of threads being engageable with the worm wheel and the other of said sets of threads being constantly engaged with the rotary actuating member; and means operative when the worm member is disengaged from the worm wheel for holding said worm member against rotation in chain unwinding direction.

5. In a hand brake mechanism, the combination with a worm wheel; of a rotary tightening element rotatable with said worm wheel; an axially displaceable rotary worm member having threads normally in engagement with the threads of the worm wheel; and a manually operated rotary actuating member having a threaded section, said worm member having additional threads engaged with the threads of said rotary actuating member, said threaded section of the rotary actuating member being screwed outwardly with respect to said last named threads of the member upon rotation of the actuating member in brake releasing direction to displace the worm member axially to disengage said first named threads from the worm wheel.

6. In a hand brake mechanism, the combination with a worm wheel; of a rotary tightening element rotatable with said worm wheel; an axially displaceable rotary member, said member and worm wheel having cooperating threads; and a rotary nut in threaded engagement with said member to screw said member outwardly of the nut member when said nut member is rotated in brake releasing direction, thereby gradually withdrawing said member from operative engagement with the worm wheel.

7. In a hand brake mechanism, the combination with a worm wheel; of a rotary tightening element rotatable with said worm wheel; an axially displaceable worm member having two sets of threads; and a rotary nut member threaded on one of said sets of threads and outwardly with respect to which said thread is screwed upon rotation of the nut member and worm member, one relatively to the other, in brake releasing direction, and inwardly of which said thread is screwed when said members are rotated, one relatively to the other, in brake tightening direction, the other set of said threads being of such a length as to mesh with the threads of the worm wheel while said first named set of threads is being screwed inwardly or outwardly of the nut to a predetermined extent, and to disengage from the threads of the worm wheel when the second named set of threads is screwed outwardly of the nut beyond said predetermined extent to permit free rotation of the tightening element in brake releasing direction; and manually operated means for rotating one of said members in brake tightening and releasing directions.

8. In a hand brake mechanism, the combination with a worm wheel; of a rotary tightening member rotatable with the worm wheel; a rotary nut; a manually actuated rotary operating member for rotating the nut; and a rotary element having a threaded section engaged with the nut at all times and being movable inwardly and outwardly with respect to the nut through the screw threaded connection therewith, said second named threaded section being of greater length than said first named threaded section.

9. In a hand brake mechanism, the combination with a worm wheel; of a rotary tightening member rotatable with the worm wheel; a rotatable nut member; a rotary and axially movable worm member having a threaded section engaging the threads of the nut, and a threaded section engageable with the threads of the worm wheel; and means for rotating said nut.

10. In a hand brake mechanism, the combination with a worm wheel; of a rotary tightening element rotatable with the worm wheel; a rotatable nut member held against movement in axial direction; a rotary and axially movable worm element, said worm element having a threaded section engageable with the threads of the worm wheel, said threaded section being normally engaged with the threads of the worm wheel and being of a length to remain in engagement with the worm wheel while said worm element is moved a predetermined distance in said axial direction, and to be disengaged from said wheel threads when moved beyond said predetermined distance, said worm also having a second threaded section engaged with the threads of the nut, said threads of the second named section being screwed outwardly of the nut when the latter is rotated in brake releasing direction to move said worm element axially to and beyond said predetermined extent and being screwed inwardly of the nut when said nut is rotated in brake tightening direction to move said worm axially to reengage the threads of the first named section with the threads of the worm wheel and maintain said threads engaged during complete application of the brakes; and manually operated means for rotating said nut.

11. In a hand brake mechanism, the combination with a rotatable member; of a winding drum; cooperating worm elements rotatable with said member and drum respectively to effect winding movement of the latter when said member is rotated in one direction; and a screw connection between said rotatable member and one of said worm elements for holding said worm elements engaged during said winding movement and automatically effecting backing off of the brakes to a predetermined extent, followed by disengagement of said worm elements to effect quick release of the brakes through rotation in a reverse direction of said rotatable member.

12. In a hand brake mechanism, the combination with a winding member; of a worm wheel rotatable with said winding member; a worm for driving said worm wheel; an actuating member having a screw connection with said worm for moving said worm axially and also rotating the same; and means for holding said worm against backward rotation when the worm is disengaged from the worm wheel.

13. In a hand brake mechanism, the combination with a winding member; of a worm wheel rotatable with said winding member; a worm for driving said worm wheel; an actuating member having a screw connection with said worm for moving said worm axially and also rotating the same; and means for holding said worm against rotation in one direction but permitting rotation of the worm in a reverse direction.

14. In a hand brake mechanism, the combination with a winding member; of a worm wheel rotatable with said winding member; a worm for driving said worm wheel; an actuating member having a screw connection with said worm for moving said worm axially and also rotating the same; and ratchet means permitting rotation of the worm in brake tightening direction and holding the same against rotation in the reverse direction.

15. In a hand brake mechanism, the combination with a winding member; of a worm wheel rotatable with said winding member; a worm for driving said worm wheel; an actuating member having a screw connection with said worm for moving said worm axially and also rotating the same; and a fixed locking element on the worm having shouldered engagement with fixed stop means to arrest rotary movement of the worm when the latter is disengaged from the worm wheel.

16. In a hand brake mechanism, the combination with a rotary actuating member held against movement in an axial direction, said member having an internally threaded section; of an axially movable worm member having a threaded section engaged within the internally threaded section of the actuating member; a worm wheel engageable with the worm; and a winding member actuated by the worm wheel.

17. In a hand brake mechanism, the combination with a rotary actuating member held against movement in an axial direction, said member having an internally threaded section; of an axially movable worm member having a threaded section engaged at one end within the internally threaded section of the actuating member; bearing means in which the other end of said worm is rotatable and axially slidable; a worm wheel engageable with the worm member; and a winding member rotatable with the worm wheel.

STACY B. HASELTINE.

CERTIFICATE OF CORRECTION.

Patent No. 2,057,827.                                                               October 20, 1936.

STACY B. HASELTINE.

It is hereby certified that error appears in the printed specification of the above numbered patent requiring correction as follows: Page 4, first column, line 73, claim 5, after the article "the" insert worm; and that the said Letters Patent should be read with this correction therein that the same may conform to the record of the case in the Patent Office.

Signed and sealed this 2nd day of March, A.D. 1937.

(Seal)                                          Henry Van Arsdale
                                              Acting Commissioner of Patents.